Aug. 10, 1926.
A. F. CORNNER ET AL
COOKER
Filed Oct. 3, 1924
1,595,226
3 Sheets-Sheet 2
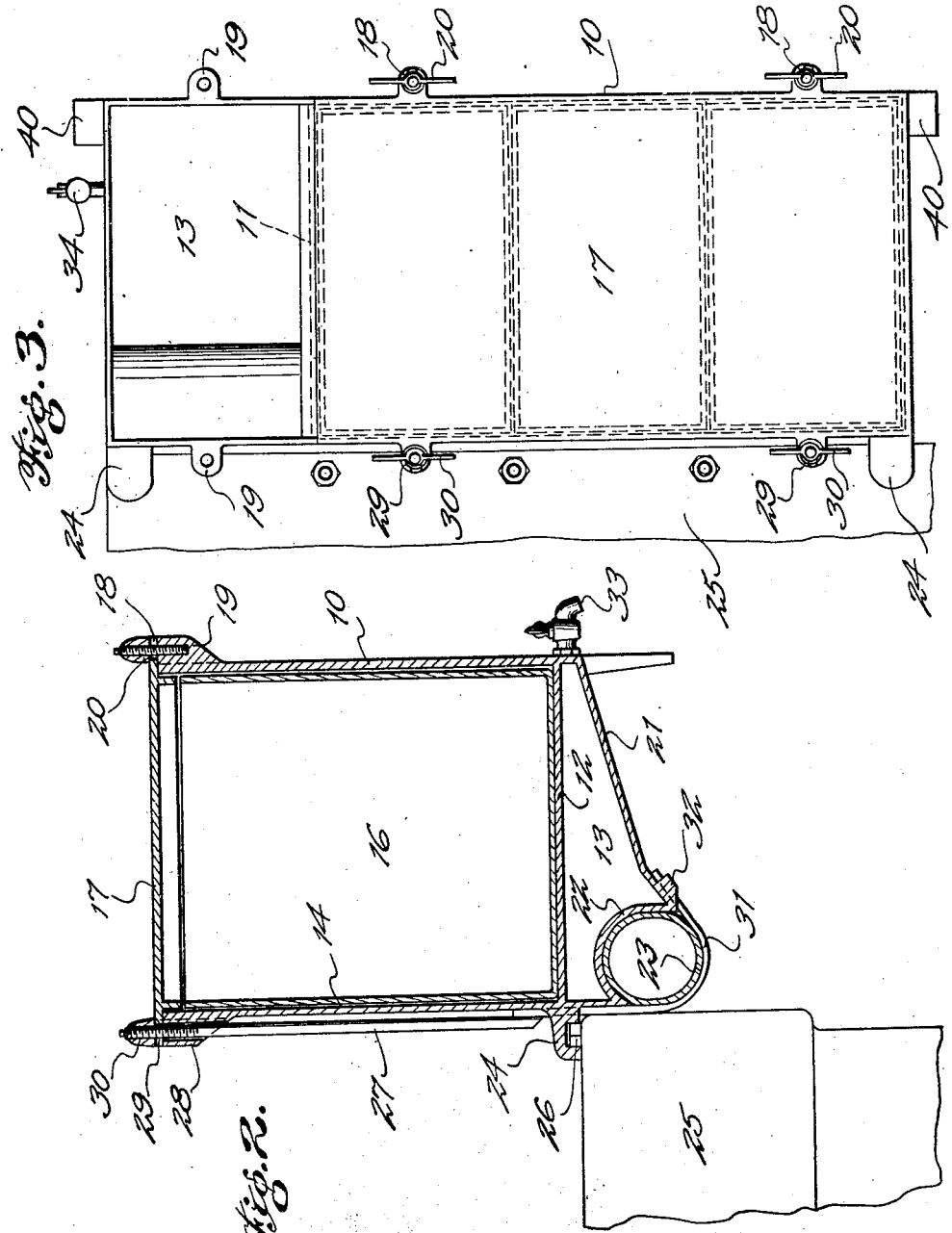
A.F. Cornner
O.W. Bottorff
INVENTORS
BY Victor J. Evans
ATTORNEY
WITNESS:

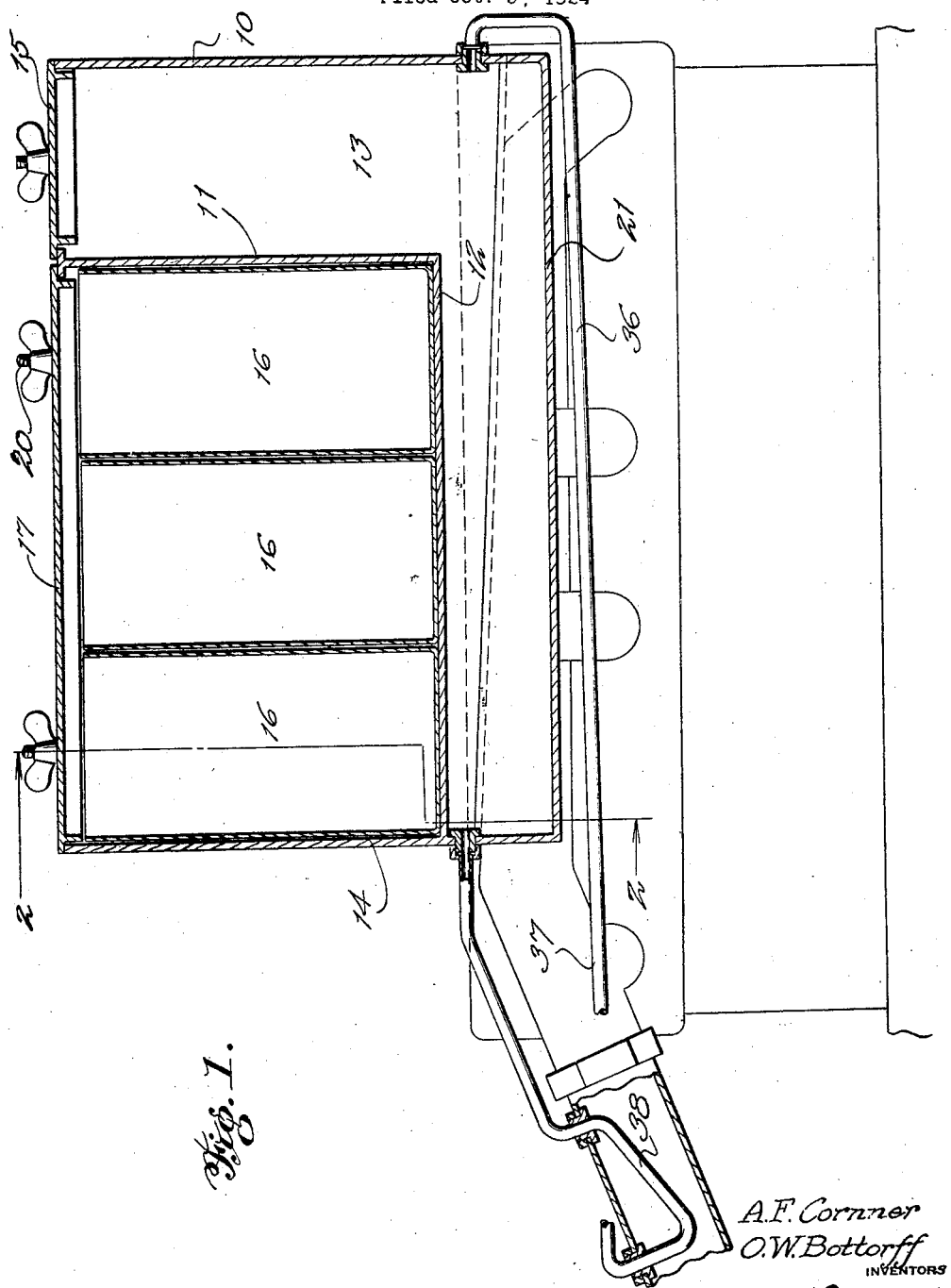

Aug. 10, 1926.
A. F. CORNNER ET AL
COOKER
Filed Oct. 3, 1924
1,595,226
3 Sheets-Sheet 3
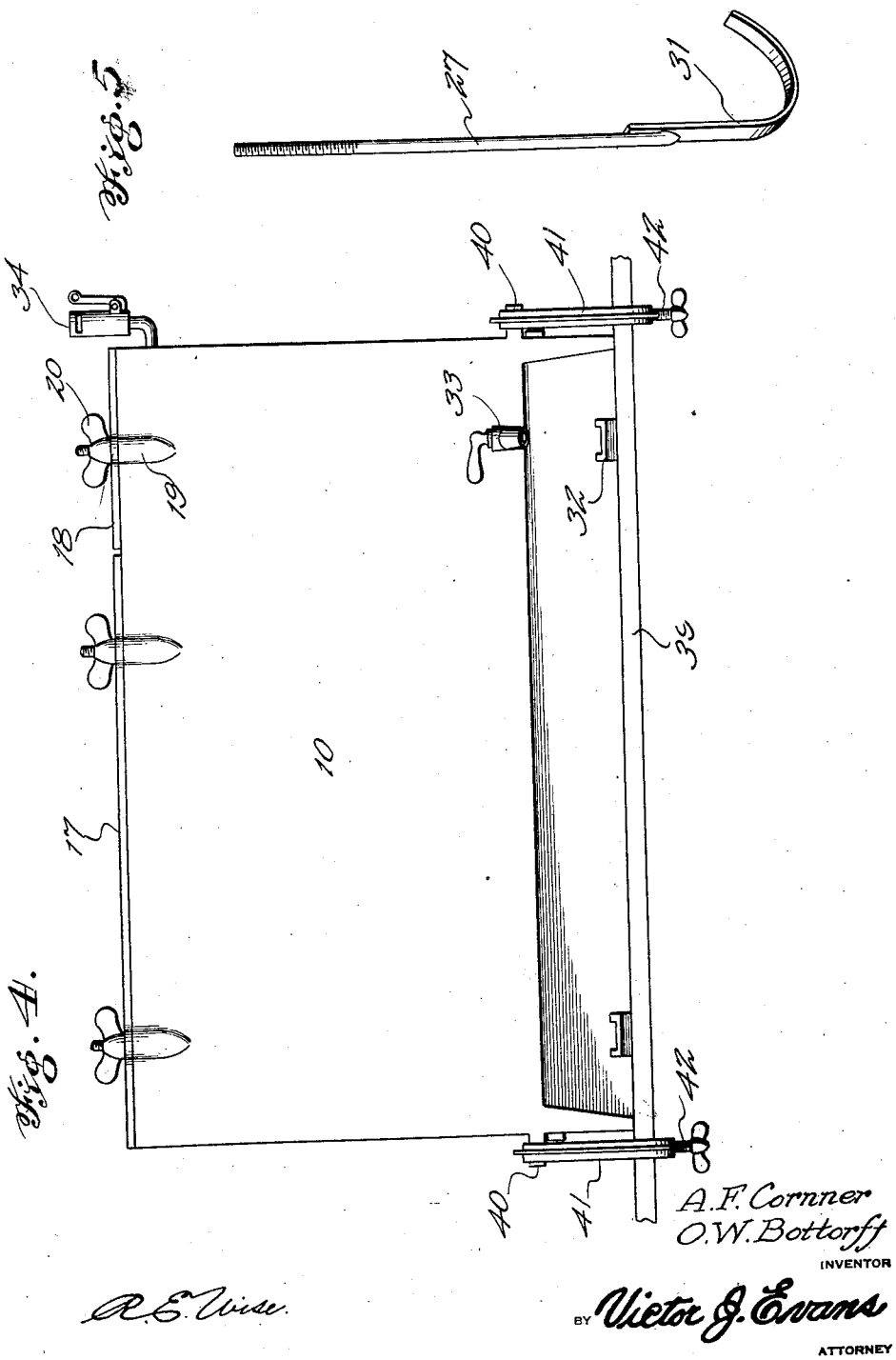
A. F. Cornner
O. W. Bottorff
INVENTOR
BY Victor J. Evans
ATTORNEY
WITNESS:

Patented Aug. 10, 1926.

1,595,226

UNITED STATES PATENT OFFICE.

ASA F. CORNNER AND ORVILLE W. BOTTORFF, OF COFFEYVILLE, KANSAS.

COOKER.

Application filed October 3, 1924. Serial No. 741,479.

This invention contemplates the provision of an automobile attachment in the nature of a cooker designed for use by tourists and adapted to be associated with the exhaust manifold of the motor, utilizing the heat therefrom for cooking purposes.

Another object of the invention resides in the provision of a cooker including a pipe terminally communicating with a fluid compartment of said cooker, and passed through the exhaust manifold, having a portion subjected to the burnt gases passing through said manifold to promote circulation of the fluid through the pipe, and at the same time heating said fluid in quick order.

In carrying out the invention, we provide means for rigidly attaching the cooker to the exhaust manifold, and means for attaching it to the running board of the vehicle as the occasion may require.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 1 is a view in elevation and partly in section showing how the cooker is mounted on the exhaust manifold of the motor.

Figure 2 is a sectional view taken on line 2—2 of Figure 1.

Figure 3 is a top plan view.

Figure 4 is a view showing how the cooker is attached to the running board of a vehicle.

Figure 5 is a detail view of one of the fastening elements for securing the cooker to the exhaust manifold.

The cooker comprises a casing 10 which may be constructed of any suitable material and also vary in size and configuration without departing from the spirit of the invention. This casing is divided by a vertical partition 11 and a horizontal partition 12 into a compartment 13 and a compartment 14. The compartment 13 opens at the top of the casing and at one side of the partition 11, and is normally closed by a removable cover 15, while this compartment also extends beneath the horizontal partition 12, being adapted to receive water or any other fluid desired to be heated. This compartment, however, is primarily intended to be used for making coffee, tea or other beverages. The compartment 14 is adapted to be used for cooking any food stuffs that are cooked either by baking, roasting or boiling, the food stuffs being adapted to be arranged in suitable receptacles 16 which are designed to fit in the compartment 14. This compartment 14 is closed by a removable cover 17 which also covers the adjacent ends of the receptacle 16 when the latter are positioned within the compartment. The covers 15 and 17 respectively are formed with projecting lugs 18 which are adapted to repose upon lugs 19 formed on the casing 10 and these lugs are designed to accommodate a fastening screw 20 by means of which the covers are held tightly closed so that the flavors of the food will be conserved and to eliminate dirt and other foreign matter from entering the cooker.

The bottom 21 of the casing 10 has a portion curved as at 22 to accommodate the exhaust manifold 23 in the manner shown in Figure 2, it being of course understood that the cooker is adapted to be arranged upon the exhaust manifold for use, utilizing the heat therefrom for cooking purposes. To assist in supporting the cooker in this position, the casing is formed with a plurality of spaced lugs 24 which are adapted to repose upon the head of the motor indicated generally at 25, and each lug 24 is recessed as shown in Figure 2 to fit over the head of the screw bolt 26 forming part of the motor structure. In addition to the lugs 24, the cooker is also maintained in its position upon the exhaust manifold by long bolts 27 which have their upper ends threaded and passed through aligned lugs 28 and 29 formed on the casing 10 and cover 17 respectively, this portion of the bolt being equipped with a thumb nut 30. Welded or otherwise suitably secured to the lower end of the bolt 27 is a curved strip 31 which passes beneath the exhaust manifold 23 and has its free end slipped through a slotted projection 32 forming an integral part of the bottom of the casing as shown in Figure 2. This strip is sufficiently flexible to allow it to be easily inserted through the projection in 32 or removed therefrom as the occasion may require, and at same time being sufficiently rigid to assist in holding the cooker associated with the exhaust manifold. Projecting from one wall of the compartment 13 is a spigot 33 for drawing off the liquid contained in said compartment. Furthermore, the cooker is provided with a safety valve indicated generally at 34.

To promote the circulation of the fluid or liquid contained in the compartment 13, we make use of a pipe 36, the free ends of which are suitably coupled to the opposed end walls of the casing 10 communicating with the compartment 13. The major portion of this pipe passes beneath the bottom 21 of the casing 10 substantially parallel with the exhaust manifold, and passes through said manifold as at 37, returning into the manifold to form a sort of coil 38, thus subjecting a portion of the pipe to the heat of the burnt gases passing through the manifold, which gases come in direct contact with the coil 38 to facilitate and promote the circulation of liquid in the compartment 13, and also to heat this liquid in quick order. If water is contained in the compartment 13, it of course is primarily used for making coffee, tea or other beverages, the heat from the water as well as the heat from the exhaust manifold is utilized to cook the products contained in the receptacle 16. If desired the cooker can be arranged inside the tonneau of a car, or can be mounted upon the running board 39 as shown in Figure 4, for which purpose, the casing 10 is formed with lugs 40 projecting from the ends thereof, which lugs are adapted to be engaged by clamps 41 designed to embrace the running board 39, and held fixed relatively thereto by clamping screw 42.

While it is believed that from the foregoing description, the nature and advantages of the invention will be readily apparent, we desire to have it understood that we do not limit ourselves to what is herein shown and described and that such changes may be resorted to when desired as fall within the scope of what is claimed.

Having thus described the invention, we claim:—

A cooker of the character described comprising an elongated casing, a horizontal partition extended throughout the major portion of its length, and a vertical partition spaced from one end wall of the casing and together with said horizontal partition defining a compartment coextensive in length with the casing and opening at the top thereof adjacent one end, the bottom wall of said compartment being curved to accommodate the exhaust manifold of an internal combustion engine upon which the casing reposes, said bottom being provided with spaced slotted lugs, vertically disposed bolts carried by the casing and secured thereto, the curved strip carried by the lower end of each bolt passed beneath the manifold and adapted to be received by the adjacent lug for holding the casing positioned upon the manifold.

In testimony whereof we affix our signatures.

ORVILLE W. BOTTORFF.
ASA F. CORNNER.